June 25, 1957 B. W. SEWELL 2,797,066
POWER BREAKOUT TOOL
Filed Jan. 26, 1954 2 Sheets-Sheet 1
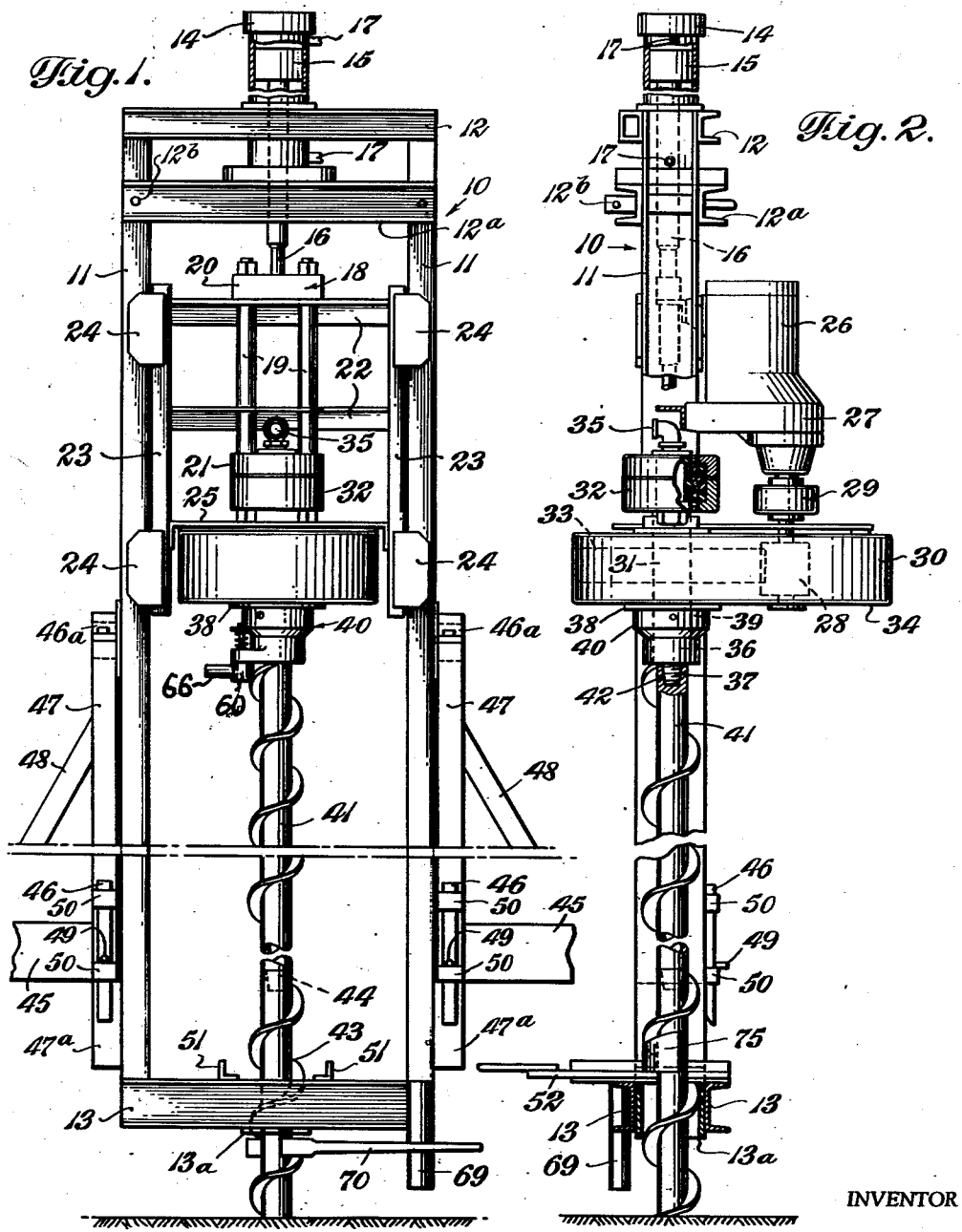
INVENTOR
Ben W. Sewell
BY
ATTORNEY June 25, 1957 B. W. SEWELL 2,797,066
POWER BREAKOUT TOOL
Filed Jan. 26, 1954 2 Sheets-Sheet 2
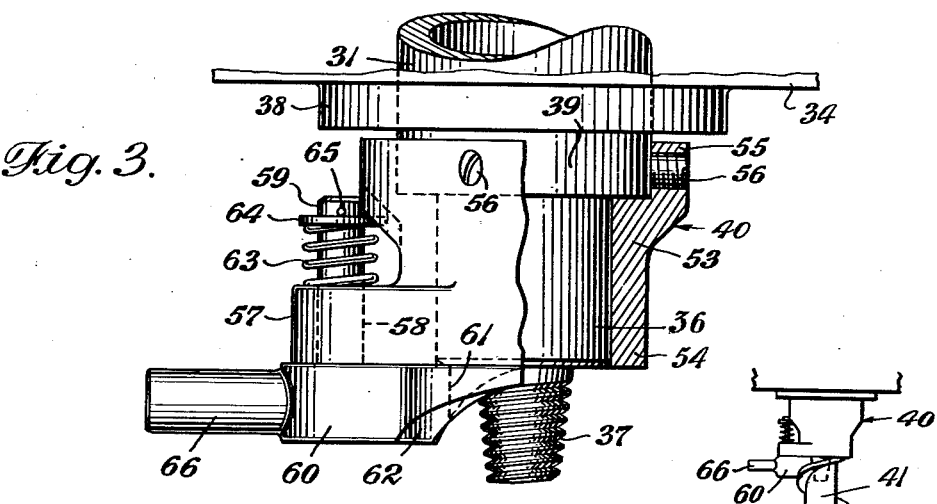
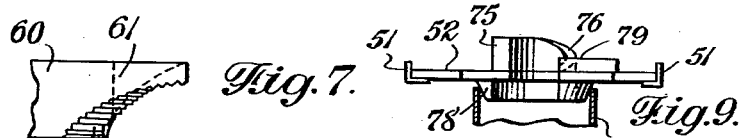
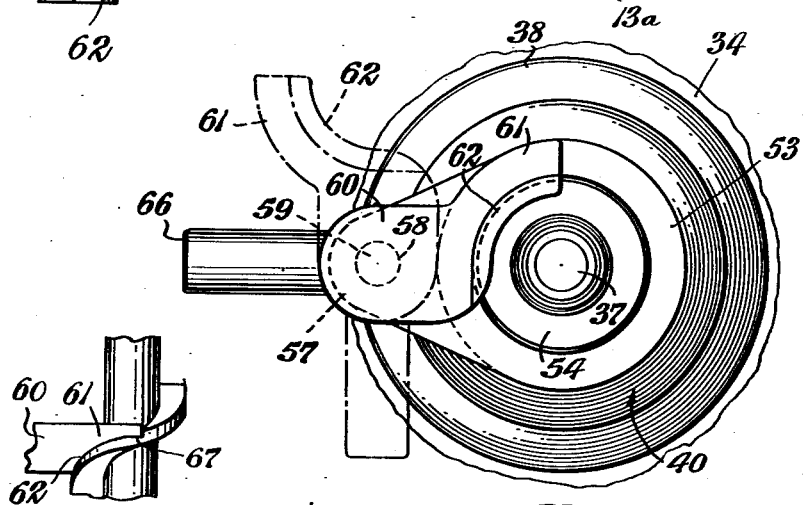
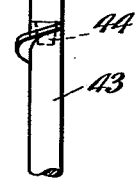
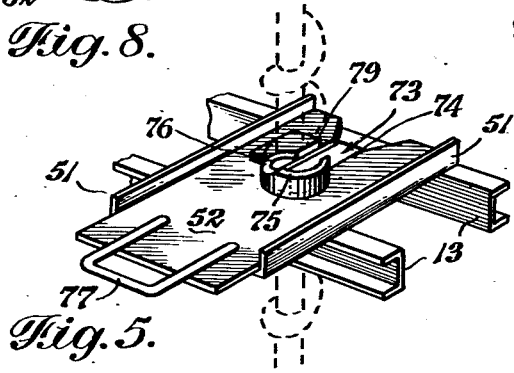
INVENTOR
Ben W. Sewell,
BY Sol B. Wiegel
ATTORNEY United States Patent Office 2,797,066
Patented June 25, 1957

2,797,066
POWER BREAKOUT TOOL
Ben W. Sewell, Tulsa, Okla.
Application January 26, 1954, Serial No. 406,191
19 Claims. (Cl. 255—35)

This invention relates generally to earth boring apparatus, and specifically to a power breakout tool useful in combination with a traveling rotary table coupled for rotary drive to a multi-unit drill stem.

More particularly, this invention is directed to a power breakout tool adapted to allow quick manual coupling of the upper joint in reverse rotation at the rotary drive of a multi-unit drill stem primarily an auger type drill stem.

The rotary driving head, rotary table, or "rotary" as this unit is hereinafter termed, carries a vertically depending rotary output shaft, threaded at its end, usually a tapered thread for quick screw coupling for rotary support and rotary drive of a multi-unit drill stem, such as a multi-unit auger bit, while feeding or removing the stem into or from the earth in boring holes sufficiently deep to require a multi-unit bit.

Such auger or analogous type drill stem is conventionally assembled into a drill stem by coupling relatively short lengths, such as 5 to 20 feet long lengths of the auger, in very long coupled lengths of up to several hundred feet or substantially longer, as needed, in the boring of a hole of adequate depth in the earth. The short lengths are coupled by screwing together of mating male and female screw threaded joints, usually tapered to have great strength and to be readily aligned for quick assembly.

The rotary table or driving head with which the tool of this invention is primarily adapted for use, is itself of the type which is raised and lowered with the bit for following the same downward as it is twisted into the earth in the boring thereof or raised upwardly as the rotary is reversed in the removal of the drill stem from the earth. The traveling rotary is most desirable for purposes of having the entire apparatus portably and compactly mounted for ready availability of power, and quick removal to and from the drilling site; but the drilling rig may also be of the relatively permanent type having its rotary table vertically traversable.

It will be understood that the rotary table need only be raised or lowered a distance of about one sectional length of bit, and accordingly, supporting apparatus, whether portable or permanent, need only be of a sufficient height therefor. Such decreased limit of vertical traverse allows the apparatus to be readily mounted portably. In any case, the sectional drill stem, such as the auger, after assembly and twisting into the earth, will be of a substantially greater length than its units and, of course, the distance which the rotary table will traverse in assembling and removal of units one at a time will correspond approximately to the single bit lengths of the character herein.

The rotary table normally exerts such rotary force or torque upon the assembled bit in boring that the screw threaded couplings, comprising each joint, become wedged more tightly as the length of the pipe progresses upwardly to the point of torque application, i. e. the rotary table.

Conversely, in untwisting, with reversal of the rotary table for removal of the bit from the earth, the greatly elongated bit may torsionally absorb the reversed strain applied from the table. Hence, the table gripping the uppermost bit length by a similar screw threaded joint tends to become uncoupled from the bit at the joint between the rotary table and the uppermost bit length rather than at some lower joint, when a gripping backup wrench is placed against the bit beneath any joint lower than the uppermost.

For boring operations using such apparatus, it is necessary, in order to uncouple each length of bit as it is removed from the earth, that the joint at the lower end of the first bit length be first uncoupled before the bit joint at the rotary table. Thereafter, the upper joint at the table is uncoupled and the table traversed down to the lower coupling position with the remaining bit in the ground to continue removal of each progressively length by length.

It is the primary object of this invention to provide a tool which cooperates with the rotary table for rotation therewith more positively coupling that table to the bit length depending therefrom so that upon reversal of the table that joint will not be immediately uncoupled, i. e. unscrewed by the reverse motion of the rotary against its right handed threaded joint coupling. This tool accordingly is fixedly mounted beneath the table for rotation therewith and grips the uppermost bit length forcing it to rotate in reverse with the rotary table. This coupling tool is used in cooperation with a back-up wrench or similarly useful device, such as a slip plate shown in a modification of this invention, which grips the bit below the next lower joint succeeding that of the coupling, and allows upon reversal of the rotary table, uncoupling of the bit at that next lower joint, thereby leaving a stub of the bit extending from the earth. Then, by again gripping the uncoupled bit length above the uncoupled joint with a backup wrench, and disengaging the power breakout tool hereof from further holding the joint at the rotary table, and continuing the rotation of the rotary table, the uppermost joint is finally uncoupled to remove the entire uppermost length of the bit or auger being disassembled.

There are other advantages to the tool of this invention in that it may be mounted cooperatively with the rotary table with only a single unit portion of the multi-unit auger coupled with a lower portion of a smooth walled multi-unit drill stem. Such combination enhances the centering of the bore. Moreover, that centering action is desirably effected in combination with a lower portion of the frame work and slip plate mounted thereon, as hereinafter described, for feeding a bit such as an auger or other drill stem into the earth for more accurate direction of the bore. That cooperative centering device and slip plate is desirably modified to operate as a holding or backup wrench to secure the lower portion of the drill stem while the joint immediately thereabove is broken or uncoupled in the reverse rotation described in the uncoupling of the upper length.

Accordingly, it is another object of this invention to provide a construction operative as a wrench or holding and centering device for feeding and uncoupling of a drill stem into and out of the earth, particularly a drill stem of the auger bit type.

Other objects are in the combination of these apparatus elements with the total earth boring assembly for more effective operation in earth boring.

Still further objects and features of my invention will be apparent from the detailed description which now follows taken in conjunction with the drawings in which—

Fig. 1 shows an assembly in elevation, portions of a drilling rig including positioning of a power breakout tool for use therewith according to the present invention;

Fig. 2 is a side view in elevation of that of Fig. 1 modified to include the improved type of wrench cooperative with the breakout tool hereof;

Fig. 3 shows the detailed assembly of the breakout tool in elevation with a portion broken away and in section to show internal construction;

Fig. 4 is a plan view of the underside of the breakout tool illustrating both operative and inoperative positions;

Fig. 5 is a detail of a slip plate useful as an auxiliary backup wrench;

Fig. 6 illustrates a combination of drill stems useful in conjunction with this power breakout tool;

Fig. 7 is a detail showing a serrated surface upon the pawl;

Fig. 8 illustrates a modified auger flight surface to allow engagement thereof by the end of the pawl.

Fig. 9 is an end elevational view of the slip plate.

Referring to Figs. 1 and 2, the overall assembly in which the power breakout tool hereof is used, comprises an upright frame work or mast 10 having vertical side legs 11 and upper and lower horizontal cross braces comprising upper channels 12, intermediate channels 12a, and lower channels 13, the channels 12 and 13 being assembled at each joining corner into a rigid, preferably rectangular, frame work as shown, by bolting or welding. The intermediate channels 12a centrally support between them a hydraulic cylinder 14 containing in slidable, fluid-tight fit therein, a piston 15 carrying on its underside a piston rod 16, which extends downward through the bottom of said cylinder, through a stuffing box (not shown), whereby the piston may be hydraulically raised or lowered by admission and withdrawal of power fluid to both sides of the piston through ducts 17.

The elongated piston rod 16 has fastened to the lower end thereof a yoke 18 comprising a pair of vertical bars or hangers 19 secured at their upper ends to a cross bar 20 and at their lower ends to a swivel 21. The hangers 19 are further fastened to a pair of horizontal cross angle irons 22 which support and brace side guiding bars 23 mounted vertically close to but slidingly separated from mast legs 11 at each vertical side. The guiding bars 23 further carry four pairs of ear-like guides 24 vertically disposed in pairs on each side of a bar 23 to slidingly fit around each mast leg 11, for slidingly guiding the entire assembly in vertical movement in the plane of the mast 10. An additional plate bracket 25 is mounted below the swivel 21 to support the rotary table to immediately transfer reactive torque from the rotary to the bars 23 and serves as a lower bracing member therefor.

Cross angles 22 further have rigidly mounted thereon a motor 26 preferably actuated hydraulically which terminates its output drive through reducing gears (not shown) in the housing 27 thereof, the output shaft being coupled to drive a spur gear 28 through a coupling member 29. The rotary driving head or table 30 comprises a main tubular shaft 31 having its upper end mounted for rotation and vertical support in the swivel bearings 32 and having its central portion drivingly interfitted within the ring gear 33 which is meshed with spur gear 28 for driving rotation thereby. The rotary table is surrounded by a housing 34. The lower end of the driving shaft 31 (Fig. 3) merges into a shaft 36 of reduced diameter which terminates in a tapered screw threaded pin 37 to which the drill stem is coupled for support and driving rotation. The shaft 31 extending through pin 37 may be internally hollow and tubular to form a duct communicating with fluid inlet 35 for supplying a drilling fluid and for this purpose the auger itself will have a continuous internal bore communicating therewith for passage of the fluid down to the boring tip.

The bottom wall of the housing 34 of the rotary table is reinforced by a boss 38 in which is mounted a bearing to support rotation of the shaft 31 in friction reducing manner. The shaft 31 terminates in a protruding shoulder or collar 39 which extends below the rotary table housing. The power breakout tool 40 of this invention is adjustably fixed upon collar 39 and mounted for rotation therewith.

The uppermost section of an auger bit 41, having at its upper end a tapered and threaded female portion of the joint 42, is threaded to the pin 37 for direct rotation by the rotary table. The auger is of the multiple unit type and, as shown, the upper section 41 would be threaded into a similar second section 43 through the next screw threaded joint 44. Each unit of the auger thereby comprises a male and female right hand screw threaded joint for securing multiple units together, only the lowermost of which would terminate in a boring tip (not shown).

The frame work 10 is mounted from any suitable base support 45 which for portability may be a skid plate carried to or mounted at the site of the bore, or the base 45 may comprise the back of a vehicle. For that type of portable mounting, the mast may be lowered for transit and erected to vertical position when ready for use. For this purpose, intermediate cross braces 12a are secured to legs 11 by manually removable pins 12b which allows the entire rotary and its traversing assembly including the hydraulic cylinder 14 to be lowered within the mast 10 to the lowest position. At about the center of gravity in lowered position a pair of pivot pins 46a are mounted laterally from the legs 11 and are pivotally supported in upright braces 47 and reinforced by angular braces 48 from the base support 45. Thus the entire mast is pivotally supported horizontally or vertically. For fastening in vertical position, the braces 47 carry straps or cleats 50 at their ends through which is inserted latching bars 46 retained by pegs 49 so that the bars 46 bear against a side extension portion 47a of the legs 11 to lock the same in vertical position as shown. Further details of such construction are shown in my copending application Ser. No. 414,693 filed of even date herewith.

The auger bit is positioned to pass between both lower horizontal frame channels 13 as shown in Fig. 2. Such positioning of the auger bit to pass vertically between both channels 13 has a vertical aligning effect upon the positioning of the bit. That vertical aligning effect is made even more accurate by securing between the two lower channels 13 a short pipe length 13a. The channels 13 are further secured transversely together by cross angle irons 51. These cross angle irons 51 serve further to slidingly receive and support a slip plate 52, as shown in detail in Figs. 5 and 9, the plate 52 being desirably slotted with a vertical cutaway portion 73 to give an even more accurate aligning effect, and further to center and support a backup wrench cylindrical segment 75 as will appear.

The breakout tool 40 as illustrated comprises generally an annular sleeve or bowl member 53 which may be fastened to the rotary shaft 31 by any suitable fastening means for rotation therewith, the sleeve being sufficiently elongated to terminate at a point near the top of the pin 37. As shown herein, particularly Fig. 3, the sleeve 53 has the longer portion of its body 54 fitted with sliding removal tolerance about the cylindrical reduced diameter extention portion 36 of the shaft 31 but the barrel member 53 is enlarged to a similar sliding fit clearance to encompass and fit about the protruding shoulder portion 39 by an upper flaring sleeve portion 55, so that the breakout tool bowl 53 in general contour is preferably a pair of cylindrical sleeve members differing in diameter, the larger of which fits around an enlarged shoulder or driving hub and the lower portion about the continuing narrow shank 36 carrying the threaded pin 37, the length of the narrow cylindrical portion 36 being sufficient to terminate at about the height of the joint formed by the pin 37 with the uppermost auger unit 41.

The flaring portion 55 of the breakout tool bowl has several set screws 56 bored radially through the enlarged portion 56 to allow adjustment and centering of the bowl on the hub 39 and secure fastening thereto for rotation therewith as it is rotarily driven by the table. The lower portion of the bowl near the joint has a horizontally built-out ear or laterally protruding lobe 57 integral with the one lower side of the bowl portion 54. The lobe 57 is vertically bored at 58 to receive a pawl support pin 59 with rotary clearance which may be attached to or integral with the bit lock member or pawl 60 above which it extends vertically for support in horizontally pivotal rotation of the pawl 60. The pawl member 60 has a pawl portion 61 which extends laterally inward towards the joint pin 37 in operative position, as shown in the full line portion of Fig. 4, about to the center line of the bit, but is curvedly offset laterally from the center of the pin 37 to a radius of curvature approximately that of the outer diameter of the bit including the flights thereof, and having at that inner portion 61 a sufficient diameter of curvature to clear the inner hub portion of the auger bit 41. The curved inner extending portion 61 of the pawl carries on its lower face 62 a helical arcuate curvature approximately corresponding to that of the pitch of a flight of the auger, but may be slightly less, to effect maximum frictional binding of a large portion of the curved pawl surface 62 against the flight of the auger frictionally for frictional gripping and wedging thereagainst in its pawl-like operation.

In assembled position, the inner pawl member 61 is rotatively supported by the pin 59 through bore 58 in the ear portion 57, the protruding portion of the pin 59 above the ear 57 being secured resiliently by a spring 63 bearing against a washer 64 secured to the outer end of pin 59 by a locking pin 65. Thus in the assembled position the supporting pin 59 is resiliently held by spring 63 urging the pin 59 upward and resiliently constraining the pawl to rotary sliding contact along the bottom of the ear member 57 and bowl portion 54 with which it is integral. The pawl member 60 accordingly is slidably rotatable about the axis of pin 59 either to a flight gripping position with its pawl surface 62 in frictional contact with the flight of the auger bit against which it wedges for positive coupling, or in the disengaged position, shown in the dotted line position of Fig. 4, where the pawl will not contact the auger bit. For purposes of horizontally moving the pawl into and out of engagement with a flight of the bit, the pawl carries an opposite outer extending handle or shank 66 on which may be applied an elongating pipe lever for forced movement in traversing of the pawl horizontally out of engagement with the auger flight surface or the same effect may be obtained by striking the shank portion 66 to effect such movement with a hammer blow, etc.

As shown assembled in Figs. 1 through 3, with the pawl in the engaged full line position of Fig. 4, and with the entire tool 40 securely mounted to rotary hub 39 of the rotary table 30, the reversal of the rotary table, i. e. in a counterclockwise direction tending to unscrew pin 37 from its complementary bore 42, the pawl through its under surface 62 tightly wedges against the helical flight of the auger unit 41 and forces the entire bit portion 41 to rotate and reverse with it, thereby preventing uncoupling of the joint. When the joint is in fact desired to be uncoupled, the handle portion 66 of the pawl is rotated 90° to swing the pawl out of engagement with the flight of the auger. Then, by continuing rotation in cooperation with the backup wrench held against the upper bit length to be finally uncoupled, the joint between that bit length and the rotary table may then be broken, i. e. uncoupled.

Thus it will be seen that the power breakout tool may be mounted at the joint of the rotary table and auger or other type of drill stem and moved to engaged position wherein the front end of the pawl wedges against the drill stem or flight thereof or may be turned out of engagement by a movement of the pawl upon its pivot pin. The engaging surface 62 of the pawl generally will be shaped to wedge against a particularly dimensioned flight of an auger, but following the principle of this tool, the surface 62 may be shaped to vary the pitch to fit any given auger or analogous drill stem surface for coupling thereof in reverse rotation. It will be seen that a great advantage of the construction shown lies in the ability to swing the pawl into engaged coupling position and quickly thereafter manually disengage the same by horizontal movement upon its pin by simple manual movement of the handle or shank portion to the desired disengaged position.

Moreover, it will be seen that in the engaged position, by properly surfacing the contacting face 62 it will tend to bite more deeply, exert more wedging frictional grip upon the flight of the auger with reverse rotation so that it will reliably give positive coupling effect while being readily removable. However, while as shown the gripping face 62 is preferably cut smoothly to effect gripping by a tight frictional wedging upon the surface of the auger flight, that surface may be serrated or roughened as shown in the detail Fig. 7, the latter construction having the advantage of being more flexibly adapted for use with a bit surface whose pitch may less accurately conform to that of the slope of the engaging surface 62. Again, as shown in a further modification in Fig. 8, a slight indentation 67 may be cut in the surface of the flight to provide a shoulder against which the blunt end of the pawl 61, may bear to enhance the reverse rotary effect in the engaged position. In each of such modifications, the flat surface 62 as shown is preferred to effect gripping entirely by wedging against the helical flight portion of the auger since the latter does not interfere in any way with normal auger construction and thereby does not tend to scratch or damage the bit by marring the smooth flight surface of the auger as would be the case where serrated teeth are provided as in Fig. 7.

In normal use of the tool, with the pawl in the engaged position to couple the upper joint for rotation in reverse with the rotary table, a backup wrench is normally placed below the next joint 44 succeeding that at the table for purposes of gripping the auger or drill stem 43 preventing reverse rotation of the drill stem whereby that lower joint may be broken at that point. As shown in Fig. 1, the mast frame leg 11 has a bar 69 extending downward therefrom serving as a backing post for any conventional backup wrench 70 against which the handle portion is held. In this position reverse rotation of the rotary table in combination with the breakout tool 40 with its pawl 60 in the engaged position as shown in Fig. 1, the thread auger pin 44 becomes unscrewed from the lower length 43 leaving the auger length 41 attached to its upper coupling at 42 and 37. Thereafter the backup wrench is placed at a higher position about the shank of the auger length 41, the breakout tool is then disengaged by rotating the pawl 60 to the dotted line position shown in Fig. 4, and again upon rotating the rotary table in reverse, the bit length 41 now becomes uncoupled at the pin 37 and 42 from the rotary table. The rotary table is then traversed to the lower position, and the pin 37 is engaged to the lower auger bit stem 43 by normal forward or clockwise rotation. The breakout tool 40 is again set with the pawl in the engaged position and the rotary table reversed and raised as the auger is unscrewed and raised from the ground to the same position as shown in Figs. 1 and 2, and the cycle of operations repeated, first breaking the lower joint of the section 43 with the breakout tool still engaged, and then disengaging the breakout tool to again break the joint at the rotary table thus removing that succeeding section 43. The process is repeated for each succeeding section of the bit.

As pointed out above, it is desirable to effect a centering of the auger between the lower cross channels 13. A more accurate centering may be obtained by mounting transverse angle irons 51 to define a rectangular opening therebetween in which a pipe section 13a is mounted, the pipe having a diameter larger than the auger and which further acts as a vertical guide for the auger. These angles 51 are placed with angle portions facing each other as shown, whereby each vertical wall thereof may act as a guide for receiving a flat slip plate 52 whereby the slip plate lies flat upon the horizontal faces of the angles and may be slid into place using the vertical walls thereof as a guide from which the sides of the plate 52 have sliding clearance. The inner end of the plate has an open slot 73 cut therein, the slotted edges 74 being set widely enough apart to slide evenly about both diametric sides of the shank or hub of the auger bit. At the inner end of the slot position of the slip plate 52 is mounted vertically a section of a cylinder 75 which has its inner end cut axially approximately in half to allow the auger shank to be housed as a centering guide. The semicylindrical guide 75 further has a portion of its upper edge 76 cut into a helix of substantially the same pitch and in the same direction as the helical flight of the auger. A handle portion 77 is mounted at the front end of the slip plate for sliding movement thereof manually. Beneath the plate surface 52 surrounding the semicylindrical inner portion 75, and opposite thereto as shown in Fig. 9, is mounted a rounded, tapered, or beveled boss or centering ring 78 which centers the plate in pipe 13a for true alignment of the slip plate and bracing thereof in use as a backup wrench. To provide additional clamping stability to prevent the auger from working out of gripping position with the edge 76, a lug 79 is provided to lie flat on the plate 52 as a raised shoulder portion bearing against the flight of the auger. This slip plate and semicylindrical guide element 75 operate not only to aid in vertical alignment of the auger for accurate vertically positioning thereof, but may be operated in use as a backup wrench when the cylindrical portion is pushed against the shank of the auger and the auger is turned in reverse until its flight comes in contact with the helical surface 76 wedging thereagainst frictionally, when held vertically stationary, to prevent further reverse rotation. Accordingly, the slip plate 52 may be used as a backup wrench to prevent turning of the auger bit wedged against its helical surface 76.

With this construction, it will be seen that when a joint 44 to be uncoupled is positioned by reverse rotation with the portion of the helical flight surface of the bit in contact with the helical surface 76, the lower joint portion 43 of the auger becomes frictionally secured by the slip plate from further rotation, while the breakout tool, in engaged position forcing rotation of the upper section of the bit 41 above that joint when reversed by the rotary table, allows the desired joint breaking to take place at that lower joint 44 position.

It will be understood that the power breakout tool hereof in broadest aspect as described comprises a sleeve or bowl member having means to grip the output shaft of the rotary firmly for rotation with a threadedly coupled joint, between that output shaft and an earth boring stem, and the bowl will be positioned about that joint to allow a pawl member pivotally supported from an end of the bowl, for horizontal pivotal movement in a manner to engage the opposite screw coupled member of the joint. The inner end of the pawl has a surface primarily designed for wedging against the flight of a multi-unit auger but may be suitably modified to engage by direct radial thrust a shoulder thereon, or formed with a serrated edge to bite into the body of the bit for that type of gripping, if desired.

While the breakout tool hereof is primarily designed as described for breaking out the joint of a multi-unit auger type bit, it may be used in conjunction with any drill stem such as a smooth walled multiple unit pipe drill stem as is conventionally used in earth boring, which for purposes of use with this tool as illustrated may have only an uppermost portion of each stem section constructed with a portion of a helical flight, each such section assembled to a multi-unit earth boring string, the lower portion of each section being smooth walled pipe. Such modified assembly is shown in the detailed Fig. 6 which illustrates the power breakout tool 40 joined to a drill string comprising multiple units coupled together by screw threads, as conventional, but each section having the helical flights near an end. Such flight portion need only be a short helical stub or lug sufficient to allow gripping by the tool pawl portion 62. With this arrangement, the power breakout tool needs no modification in pawl surface for maintaining the upper joint firmly coupled in reverse rotation of the rotary, and has further the advantage, particularly in initiating boring operations, that the helical portion of this heterogeneous multi-unit drill stem assembly allows better centering of the hole in boring.

Where portions of such drill stem are smooth as in pipe or rod, the breakout tool is used in cooperation with any ordinary backup wrench gripping the outer wall or shank thereof below its next lower joint with respect to the breakout tool; where a continuous flight auger is used, the slip plate described herein may be used instead of the conventional backup wrench. While, as described, the slip plate has utility for centering of the auger, as well as use as a backup wrench, it will continue to grip the flight of the auger in contact therewith after the joint thereabove has been uncoupled, and will thereby further serve to support and prevent the long stub of drill stem remaining in the bore hole from dropping back until it has been again coupled to the rotary.

Certain additional modifications will occur to those skilled in the art. The power breakout tool hereof may be used with a modified type of traversable rotary table, suitably secured to the underside thereof; that is, instead of securing the bowl portion 55 to a hub 39 through set screws 56, it may be splined thereto, or threaded thereto with a left hand thread.

For boring deep holes it is sometimes desirable to supply a drilling fluid, water, or mud, to the lower end of the bit in the hole being bored. For this purpose, the auger may have a hollow or tubular shank to allow continuous fluid passage from one unit to the next when coupled together, and the rotary output shaft may itself be entirely hollow to communicate through hollow threaded coupling pin 37 with the multi-unit bit coupled thereto. Drilling fluid then passed into the system through duct 35 will then pass downward through the multi-unit boring tool assembly to be evolved at the bottom of the bore hole for lubrication and cooling of the lowermost tip of the drilling stem.

It is accordingly intended that the description hereof be regarded as illustrative and not limiting except as defined in the claims appended hereto.

I claim:

1. In an earth boring rig, a vertically traversable rotary driving member coupled for vertical support and rotation by a screw threaded joint therebeneath to the upper unit of a multi-unit series of vertically disposed drill stem elements, each joined by threading at its end to the next, means for vertically traversing said rotary driving member and drill stem, and a breakout tool comprising a pawl drivingly coupled to said rotary driving member for rotation therewith and pivotally mounted thereto above the joint with the upper drill stem element for pivotal movement in a plane substantially normal to the axis of rotation of the joined assembly to drivingly engage the drill stem element extending below said joint.

2. In an earth boring rig, a vertically traversable rotary driving member threaded at its lower end and joined in a screw threaded joint for driving rotation and support to the upper end of a multi-unit drill stem, the multi-unit drill stem comprising an assembly of a series of elongated members each joined at an end to the next by threading, at least the uppermost member of the series of drill stem units comprising an auger unit having helical flights, means for vertically traversing said rotary driving member and drill stem, and a breakout tool comprising a pawl drivingly coupled to said rotary driving member for rotation therewith and pivotally mounted thereto above the joint with the upper auger unit for pivotal movement in a plane normal to the axis of the joined assembly to drivingly engage the upper auger unit below said joint.

3. In an earth boring rig, a vertically traversable rotary driving member having a threaded output drive threadedly joined to the upper unit for support and rotation of a multi-unit auger bit vertically dependent therefrom, said multi-unit auger threadedly joined into an assembly of elongated members each joined at its end to the next by threading, each joined auger unit having cooperative helical flights assembled to a continuous helical flight boring tool, means for vertically traversing said rotary driving member and auger units attached thereto, means carried by said rig for engaging a flight portion of said auger for support thereof beneath a joint next lower than the uppermost with the rotary driving member, and a breakout tool comprising a pawl drivingly coupled to said rotary driving member for rotation therewith and pivotally mounted thereto above the joint with the upper auger unit for pivotal movement in a plane normal to the axis of the joined assembly to drivingly engage the upper auger unit below said joint.

4. In an earth boring rig, a vertically traversable rotary driving member having a threaded output drive threadedly joined to the upper unit of a multi-unit earth boring tool vertically dependent therefrom for support and rotation, each unit being coupled at its end to the next by a threaded joint, means for raising and lowering said rotary driving member and multi-unit earth boring tool, and a breakout tool comprising a sleeve fastened for driving rotation above the uppermost threaded joint about said output drive shaft of said rotary driving member, said sleeve pivotally supporting a pawl for pivotal movement normal to the axis of and below the joint with the uppermost unit of said boring tool, said pawl having its inner surface shaped to engage the surface of said uppermost unit drivingly at its inner pivotal position in reverse rotation with respect to the threading of said joint.

5. In an earth boring rig, a vertically traversable rotary driving member, a multi-unit helical flight auger bit each unit being coupled at its end to the next by a threaded joint with the flights thereof continuously aligned as a helix, the uppermost unit of said auger bit being threadedly coupled to a driving output shaft of said rotary drive in vertical earth boring position, means for raising and lowering said rotary drive and multi-unit auger bit, and a breakout tool comprising a sleeve fastened for driving rotation above the uppermost threaded joint about said output drive shaft of said rotary, said sleeve pivotally supporting a pawl for pivotal movement normal to the axis of and below the joint with the uppermost unit of said auger bit, said pawl having its inner surface shaped to engage the helical flight of said uppermost auger unit drivingly at its inner pivotal position in reverse rotation with respect to the threading of said joint.

6. In an earth boring rig, a vertically traversable rotary driving member, a multi-unit helical flight auger bit each unit being coupled at its end to the next by a threaded joint with the flights thereof continuously aligned as a helix, the uppermost unit of said auger bit being threadedly coupled to a driving output shaft of said rotary drive in vertical earth boring position, means for raising and lowering said rotary driving member and multi-unit auger bit, and a breakout tool comprising a sleeve fastened for driving rotation above the uppermost threaded joint about said output drive shaft of said rotary, said sleeve pivotally supporting a pawl for pivotal movement normal to the axis of and below the joint with the uppermost unit of said auger bit, said pawl having its inner surface helically curved to wedge against a flight portion of said auger at its inner pivotal position in driving engagement with said auger flight.

7. In an earth boring rig, a vertically traversable rotary driving member, a multi-unit earth boring tool each unit being coupled at its end to the next by a threaded joint, the uppermost unit being threadedly coupled to a driving output shaft of said rotary drive in vertical earth boring position, means for raising and lowering said rotary drive and multi-unit boring tool, and a breakout tool comprising a sleeve fastened for driving rotation above the uppermost threaded joint about said output drive shaft of said rotary, said sleeve pivotally supporting a pawl for pivotal movement normal to the axis of and below the joint with the uppermost unit of said boring tool, said pawl having its inner surface shaped to engage said uppermost boring tool unit drivingly at its inner pivotal position in reverse rotation with respect to the threading of said joint, and handle means extending laterally from pawl for manual movement thereof on its pivot out of driving engagement with said boring tool.

8. A rotary drive multi-unit helical flight auger bit joint coupling tool adapted for coupling the uppermost screw threaded joint between a rotary drive and said multi-unit auger in reverse rotation with respect to the threading of said joint to prevent uncoupling thereof, said tool comprising an annular open ended bowl member having means near one end thereof for drivingly securing said bowl member about the rotary output shaft of a rotary drive, said bowl pivotally supporting a pawl below the opposite end thereof for pivotal movement in a plane normal to the axis of said bowl, said pawl having its inner surface helically curved to wedge against a flight portion of said auger.

9. A slip plate adapted for supporting and securing an auger bit against reverse rotation, comprising a base member having a slot sized to slidingly receive the shank portion of an auger bit from which the flight portion thereof laterally extends in a helical curve, a segment of a cylinder mounted with its axis normal to the base at the inner end of said slot, said cylinder having an inside diameter greater than the shank of said auger but less than the outer flight diameter thereof, the upper surface of said cylindrical section having a helically curved edge of substantially the same pitch as the auger flight cooperatively used therewith, whereby upon mounting the shank of said auger within said cylindrical section and rotation thereof in reverse while being held vertically stationary the auger flight will engage said helically curved edge and be frictionally gripped thereby to prevent further rotation.

10. The combination of an earth boring helical flight auger bit with a coupling tool for securing a screw-threaded joint of the auger bit against uncoupling when rotated in a direction reversed with respect to the threads of said joint, said coupling tool comprising a support, means for fastening said support to one rotary member of said joint for rotation therewith and means pivotally carried by said support for pivotal movement in a plane normal to the axis of said auger into driving engagement with a helical flight portion of the auger bit comprising the other member of said joint.

11. Power breakout tool, adapted for locking the joint between a multi-unit auger and the rotary drive connected thereto by screw threads against uncoupling upon rotation of the rotary drive reversed with respect to said threaded joint, comprising a sleeve member, means for fastening said sleeve member about said rotary drive for positive rotation thereof, said sleeve member having a laterally extending ear mounted near an end thereof, said ear being vertically bored parallel to the axis of said sleeve to receive and vertically support therein a pivot pin, a pawl member comprising an elongated bar having a pivot pin sized to sliding clearance in said bore extending normal to the long axis and at a distance from an end of said bore less than about the radius of said sleeve, said pawl being resiliently mounted for pivotal support with the pivot pin in the bore of said ear for pivotal movement normal to the axis of said sleeve, said pawl having the lower side of its inner radius-measured end helically curved to frictionally engage against a helical flight of said auger when pivotally moved in contact therewith for positive driving rotation thereof and having the outer opposite end of said pawl extending outwardly of said sleeve as a handle member.

12. Joint coupling tool comprising an annular open ended bowl member having means for drivingly securing said bowl about a rotary output drive shaft of a rotary drive, said bowl pivotally supporting a pawl for radial pivotal movement in a plane normal to the axis of said bowl, said pawl comprising a lever member pivoted in said pivotal support intermediate the ends thereof, one end extending from said pivotal support a substantial distance not exceeding the radius of said bowl and shaped on one surface to grip the surface of an annular body mounted coaxial with said bowl member for driving engagement thereof and the other end of said pawl extending at least an equivalent distance from said pivotal support providing a means for applying pivotal movement to said pivoted lever for engagement and disengagement of its opposite gripping end.

13. In an earth boring rig, a vertically traversable rotary driving member having a threaded output drive joined to the upper unit for support and rotation of a multi-unit auger bit vertically dependent therefrom, said multi-unit auger being threadedly joined into an assembly of elongated members each joined at its end to the next by threading, each joined auger unit having cooperative helical flights assembled to a continuous helical flight boring tool, means for vertically traversing said rotary driving member and auger units attached thereto, means carried by said rig for engaging a flight portion of said auger for support of a lower unit and preventing rotation of only the unit engaged whereby a joint near the engaged portion may be uncoupled upon reverse rotation of said rotary driving member, said means comprising a segment of a cylinder supported by said rig beneath a flight of the auger below the joint thereof to be broken, said cylindrical segment having an upper surface helically cut to substantially the same pitch as the flight of the auger.

14. A joint coupling tool adapted to lock a screw-threaded joint of a multi-unit earth boring stem, said tool having means for drivingly mounting the same for rotation with the drill stem at one side of a joint to be coupled, a pivot member extending from said mounting means to a point below said joint, a pawl mounted from said pivot member for pivotal movement below said joint in a plane substantially normal to the axis of the coupled joint, said pawl having its inner pivotal end shaped to drivingly engage the lower element of said joint.

15. A power breakout tool comprising means for drivingly securing a pawl about the rotary output of a rotary drive for a multi-unit drill stem threadedly coupled thereto, said securing means being adapted to support said pawl for pivotal movement in a plane normal to the axis of said multi-unit drill stem, said plane being disposed a sufficient distance below said securing means to allow the tool to straddle the joint between said rotary drive and the upper unit of said drill stem threadedly coupled thereto, said pawl having its inner surface formed to drivingly engage the lower member of said joint.

16. A slip plate adapted for supporting and securing an auger bit against reverse rotation comprising a base member having a slot sized to a diameter to fit about the shank portion of an auger bit from which the flight portion thereof laterally extends in a helical curve, said slot having its inner end curved to semi-circularly encompass said auger shank with a diameter less than that of the flight portion, and a flight engaging surface mounted from said base near the inner rounded edge of said slot curved upwardly from said base in a curvature similar to said flight to bear against a portion thereof.

17. Slip plate as defined in claim 16 further including means, bearing against the auger on reverse rotation, for preventing radial disengagement of the auger flight with said curved flight engaging surface.

18. A slip plate adapted for supporting and securing an auger bit against reverse rotation comprising a base member having a slot sized to a diameter to fit about the shank portion of an auger bit from which the flight portion thereof laterally extends in a helical curve, said slot having its inner end curved to semi-circularly encompass said auger shank with a diameter less than that of the flight portion, and a flight engaging surface mounted from said base near the inner rounded edge of said slot curved upwardly from said base in a curvature similar to said flight to bear against a portion thereof, a lug having an edge rising as a continuation of the cut wall of said slot disposed on said base near the lower end of said flight engaging surface, said lug having an upper surface rising above the lower end of the flight engaging surface and having a curvature discontinuous therewith, said lug having a curved vertical surface substantially concentric with the curved end of said slot and at a diameter approximately that of said flight and adapted as a shoulder portion to bear against said flight.

19. A joint securing means comprising a pawl, means for pivotally securing the pawl on one side of a joint for pivotal movement in a plane normal to the axis of the joint, said pawl comprising an inner and outer shank portion disposed on opposite sides of said pivot, the inner side of said shank being curved to tangentially engage a curved surface comprising a member of said joint, the outer shank portion of said pawl adapted as a handle member for pivotal movement of said pawl and being proportioned with respect to the inner shank portion for balanced movement of the pawl about its pivot.

References Cited in the file of this patent

UNITED STATES PATENTS

| | | |
|---|---|---|
| 2,276,016 | Brantly | Mar. 10, 1942 |
| 2,509,410 | Applegate | May 30, 1950 |
| 2,657,908 | Failing | Nov. 3, 1953 |